United States Patent
Yang

(10) Patent No.: US 9,384,584 B2
(45) Date of Patent: Jul. 5, 2016

(54) DISPLAY LIST CONTROL STREAM GROUPING IN TILE BASED 3D COMPUTER GRAPHICS SYSTEM

(75) Inventor: Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 109 days.

(21) Appl. No.: 12/998,972

(22) PCT Filed: Dec. 23, 2009

(86) PCT No.: PCT/GB2009/002960
§ 371 (c)(1),
(2), (4) Date: Aug. 30, 2011

(87) PCT Pub. No.: WO2010/073017
PCT Pub. Date: Jul. 1, 2010

(65) Prior Publication Data
US 2011/0304608 A1    Dec. 15, 2011

(30) Foreign Application Priority Data
Dec. 23, 2008    (GB) .................................. 0823468.4

(51) Int. Cl.
*G06T 15/00*    (2011.01)

(52) U.S. Cl.
CPC ........... *G06T 15/005* (2013.01); *G06T 2210/52* (2013.01)

(58) Field of Classification Search
USPC ........................................................ 345/419
See application file for complete search history.

(56) References Cited

U.S. PATENT DOCUMENTS

| 5,821,950 A | 10/1998 | Rentschler et al. |
| 5,867,166 A | 2/1999 | Myhrvold et al. |
| 6,084,591 A | 7/2000 | Aleksic |
| 6,104,417 A | 8/2000 | Nielsen et al. |

(Continued)

FOREIGN PATENT DOCUMENTS

| CN | 1669055 A | 9/2005 |
| CN | 101067869 A | 11/2007 |

(Continued)

OTHER PUBLICATIONS

Response to non-final OA filed in U.S. Appl. No. 12/998,948 May 9, 2014.

(Continued)

*Primary Examiner* — Barry Drennan
*Assistant Examiner* — Richard M Russell
(74) *Attorney, Agent, or Firm* — Vorys, Sater, Seymour and Pease LLP; Vincent M DeLuca

(57) ABSTRACT

A method and apparatus are provided for rendering a 3 dimensional computer graphics image. The image is subdivided into a plurality of rectangular areas and primitives which may be visible in the image are assigned to respective ones of a plurality of primitive blocks. A determination is made as to which primitive blocks contain primitives which intersect each rectangular area. The rectangular areas are then grouped into a plurality of fixed size groups and control stream data for each of the fixed size groups is derived, this control stream data including data which determines which primitive blocks are required to render the rectangular areas in each respective first fixed size group. The control stream data is then used to render the image for display.

17 Claims, 6 Drawing Sheets

(56) References Cited

U.S. PATENT DOCUMENTS

| | | |
|---|---|---|
| 6,326,964 B1 | 12/2001 | Snyder et al. |
| 6,380,935 B1 * | 4/2002 | Heeschen et al. ............ 345/423 |
| 6,697,063 B1 | 2/2004 | Zhu |
| 6,747,658 B2 * | 6/2004 | Doyle et al. ................. 345/559 |
| 6,798,410 B1 | 9/2004 | Redshaw et al. |
| 6,856,320 B1 | 2/2005 | Rubinstein et al. |
| 6,972,768 B2 * | 12/2005 | Hussain et al. ............... 345/531 |
| 7,102,646 B1 | 9/2006 | Rubinstein et al. |
| 7,170,515 B1 | 1/2007 | Zhu |
| 7,324,115 B2 | 1/2008 | Fraser |
| 7,719,539 B2 | 5/2010 | Morphet |
| 7,834,872 B2 | 11/2010 | Fenney et al. |
| 2002/0015055 A1 | 2/2002 | Foran |
| 2002/0039100 A1 | 4/2002 | Morphet |
| 2004/0155878 A1 | 8/2004 | Inazumi |
| 2004/0233207 A1 | 11/2004 | Morphet |
| 2005/0057571 A1 | 3/2005 | Stevens |
| 2005/0285867 A1 | 12/2005 | Brunner et al. |
| 2007/0132772 A1 | 6/2007 | Morphet |
| 2007/0146378 A1 * | 6/2007 | Sorgard et al. ............... 345/581 |
| 2008/0098201 A1 * | 4/2008 | Stuttard ................ G06F 9/3001 712/22 |
| 2009/0066694 A1 | 3/2009 | Redshaw et al. |
| 2010/0220106 A1 | 9/2010 | Morphet |

FOREIGN PATENT DOCUMENTS

| | | |
|---|---|---|
| GB | 2387094 A | 10/2003 |
| GB | 2433014 A | 6/2007 |
| GB | 2457525 A | 8/2009 |
| JP | 2002529868 A | 9/2002 |
| JP | 2003536153 A | 12/2003 |
| JP | 2005525617 A | 8/2005 |
| JP | 2007157155 A | 6/2007 |
| WO | 0028480 A1 | 5/2000 |
| WO | WO 01/95257 A1 | 12/2001 |
| WO | 0207092 A3 | 4/2002 |
| WO | 2008037954 A2 | 4/2008 |

OTHER PUBLICATIONS

Response to non-final office action in U.S. Appl. No. 12/998,948, Jun. 28, 2013.
Form PCT/ISA/220, Apr. 14, 2010.
Form PCT/ISA/210, Apr. 14, 2010.
Form PCT/ISA/237, Apr. 14, 2010.

* cited by examiner

DISPLAY LIST CONTROL STREAM GROUPING IN TILE BASED 3D COMPUTER GRAPHICS SYSTEM

FIELD OF THE INVENTION

This invention relates to 3-dimensional computer graphics systems, and in particular to tile based systems and seeks to enhance the performance of tile based rendering.

BACKGROUND TO THE INVENTION

As technologies develop rapidly, the complexity of 3-dimensional computer generated images increases. One can easily build a computer model for very complicated 3D objects, such as human movements using vertices and triangle meshes. These kinds of 3D models can then be sent into a 3D computer graphics system and animated 3D images are generated on the computer screen. Computer generated 3D animated images are widely used in 3D computer games, navigation tools and computer aided engineering design tools.

3D computer graphics system has to cope with demands for more complex graphics and faster speed display. As the details increase in the display model, more and more primitives and vertices are used. Also as the texture and shading techniques evolving, more and more information comes with primitive and vertex data. In modern games there may be over a million primitives in a render. So the memory bandwidth is a very big factor on the performance of computer graphics systems.

Tile based rendering systems are well-known. These subdivide an image into a plurality of rectangular blocks or tiles. In British Patent GB2343603 and International Patent Application number WO 2004/086309 the render surface is divided into sub surfaces in n×m pixel tiles. A primitive like triangle, line or point is only processed in tiles which overlap with the primitive.

The main steps performed for tiling in a tile based 3D computer graphics system are shown in FIG. 1.

1. Input data stream of primitives and vertices as 101 in FIG. 1. Primitives in similar locations may arrive sequentially in time, like triangle strips and fans.

2. Macro Tiling Engine (MTE) transforms the vertices into screen space, removes primitives which may be back faced or clipped by a clipping plane using well-know methods. The primitives are grouped into primitive blocks with a fixed maximum number of vertices and primitives, and are written into memory as 102 in FIG. 1. The number of vertices and primitives together with the memory addresses of the primitive blocks (primitive block pointers) are sent to a Tiling Engine to be added to the control stream of the display list for the tiles which are covered by the primitives.

To minimize the impact of memory bandwidth when fetching primitive and vertex data, primitives are grouped into primitive blocks a macro tiles depending upon a bounding box for the primitive block. As in FIG. 2 a macro tile 201 is a rectangular area of the screen 200 with a fixed number of tiles 202. A macro tile can be a quarter or $16^{th}$ of the screen size, which is used to localize the primitive blocks and reduce memory bandwidth. When primitives in a primitive block cross macro tiles, they are written to a special macro tile called global macro tile. In this way the parameter data in a primitive block are only written once. Primitives from a macro tile can only be accessed by the tiles inside the macro tile, while primitives from a global macro tile can be accessed by all the tiles.

3. Tiling Engine (TE) as 103 in FIG. 1. Each primitive from a primitive block written in Macro Tiling Engine 102, is checked against each tile inside the bounding box of the primitive block. The primitive block is added to the display list of the tile which is covered by any primitives in the primitive block. The control data written in the control stream associated with the display list of the tile includes a primitive block header for the number of vertices and primitives in the primitive block, a primitive block pointer for the memory address of the primitive block written to, and a primitive mask for the primitives which are visible in the tile.

Separate memory spaces are allocated to each tile for control stream data in the display list. A memory address pointer called a tail pointer is used for the next free address in the control stream data of each tile.

To improve memory access for the control streams in tiles, a small cache Tail Pointer Cache can be added to the Tiling Engine. The memory location of the end of the control stream in a tile is stored and read from the Tail Pointer Cache, which reduces main memory accesses from the Tiling Engine.

4. 3D image processing. The 3D image processing in a tile based 3D computer graphics system is performed for each tile of the screen from a region array 300 in FIG. 3. It traverses through the control stream of each tile 301 in FIG. 3, and reads the vertex and primitive data from memory addresses pointed by the primitive block pointer in the control data 302 in FIG. 3. Image processing operations such as hidden surface removal, texturing and shading are performed on all the primitives valid in a tile from the primitive block.

An example of tile based render is shown in FIG. 8. A macro tile MT0 800 which is part of the screen has 16 tiles 801 inside. Two triangle strips 802, 803 and a big triangle 804 are processed by Macro Tile Engine MTE 805 and projected into part of the screen in MT0. The vertex and primitive data associated with the three primitive blocks are written to memory 807 with their own memory addresses. The memory address pointers of the three primitive blocks are then passed to Tiling Engine TE 806 for tiling processing. All the tiles are traversed by Tiling Engine to decide if any primitives are inside the tile and control stream data associated to the primitive block which is visible in the tile are written to memory for the tile display list. In the example display control stream in T4 will include control data for the address pointers of the three primitive blocks and triangle visible mask of the triangles within the primitive blocks 802 and 804. For example the first three triangles from left in primitive block 802 and the big triangle from primitive block 804 are visible in T4. For tile T10 the control stream data will only consists of the information from primitive block 803 and 804. Meanwhile the control data such as address pointer of the vertex data associated to primitive block 803 are inserted into control streams for tile T10, T11, T14 and T15, while control data associated with primitive block 804 are inserted into control streams for every tile in the macro tile MT0.

In 3D render processing 808 all the tiles are processed one by one in the order of region array as 300 in FIG. 3. For each tile in 3D processing control data from the tile control stream are read from memory first, as 301 in FIG. 3. Vertex and primitive data associated to the primitive blocks in the tile control data are read from memory as 302 in FIG. 3 therefore all the triangles which are visible to the tile are processed and rendered to screen.

For tile based computer graphics system the render is performed on a tile by tile basis. The big advantage of tile based rendering is that it significantly reduces the requirement for graphics system internal storage and memory bandwidth.

The disadvantage of tile based rendering is the increased control data needed for the display list in each tile. Display control data need to be written to all the tiles which a triangle covers. For large triangles which cover many tiles the total amount of control data written is significant.

For example a render with screen size 1920×1080 can be divided into 8160 tiles of 16×16 pixels. A big triangle which covers the whole screen has to be added to the display lists of all the tiles. If there are two 32 bit words needed for the control data, then the total control stream data is nearly 64 KB for the single full screen triangle. The large amount of control data needed in this case has a significant impact on the performance of the render in tile based 3D computer graphics system.

The system presented in UK Patent Application No. 0717781.9, processes two tiles at the same time in order to improve the performance of Tiling Engine. The control stream data from the two adjacent tiles are combined into a single display list, which gives the total control stream data of near 32 KB from the above example. The size of the control stream data is about half the size in the case, but it is still a significant amount of control data for a triangle.

SUMMARY OF THE INVENTION

Preferred embodiments of the present invention provide a method and apparatus for display list control stream grouping in a tile based 3D computer graphics system.

In a tile based rendering system triangles covering multiple tiles consume memory and bandwidth for every tile into which a reference must be placed. The method of display list control stream grouping of the embodiment of the invention organizes a tile based display list into tile groups to form a single display list control stream with control stream data being applied to the groups rather then to individual tiles. A whole control data block can be skipped in a tile if the control stream data in the block are not referenced in the tile. The amount of control stream data needed is reduced by the tile group based display list control stream. The embodiment also introduces a control pointer array to increase the efficiency of processing control stream data. By optimizing the display list control stream the method presented reduces the internal parameter memory bandwidth, therefore improves the performance of tile based 3D graphics system.

DETAILED DESCRIPTION OF A PREFERRED EMBODIMENT

In tile based 3D computer graphics systems as described above, the Tiling Engine takes primitive blocks from the Macro Tiling Engine and computes the minimum number of tiles needed to render the primitives. The minimal list of tiles is then processed and a primitive block pointer for the address of the primitive block data along with a primitive header word describing the primitives present in the tile are written to dynamically allocated memory as control stream data, at 301 shown in FIG. 3.

Each tile has its own fixed size memory space used for the control stream data. The memory blocks are allocated on demand by the tile based 3D computer graphics system. When new data is to be added to the control stream for a particular tile exceeds the size of the current memory block allocated, a new allocation is requested and the old control stream is linked to the new allocation using a stream link. If the Macro Tiling Engine indicates the end of a scene via a terminate signal, all the tiles are processed, and control streams for tiles in the valid region are ended with a terminate word.

In a tile based 3D computer graphics system the vertex and index data for a primitive block may only be written once to a macro tile to which the primitive block belongs, or in the global macro tile when the bounding box of the primitive block crosses macro tiles. But for primitive blocks which contain large primitives control stream data may need to be written multiple times to all the tiles which the primitives overlap. In an extreme case such as a full screen triangle, the control stream data have to be written to every tile on screen. The repetitions of control stream data written cause an increase in memory bandwidth.

In the preferred embodiment of the invention, the control streams from a tile based display list are optimized into a control stream for a group of tiles, instead of one control stream per tile display list.

Control Streams in Control Stream Grouping

Figure 3:
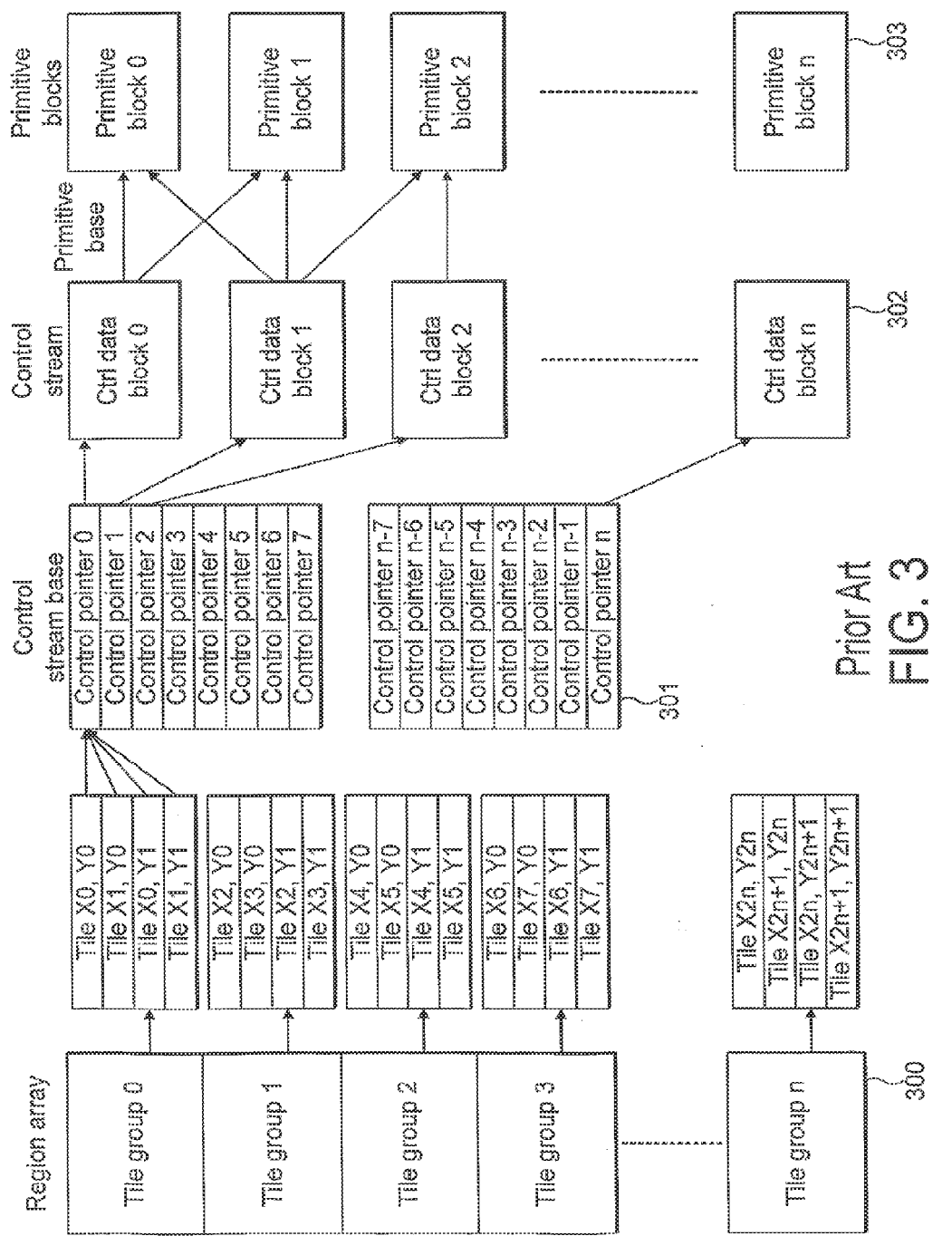
FIG. 3 shows an overview of the display list control stream grouping in tile based rendering.
Figure 4:
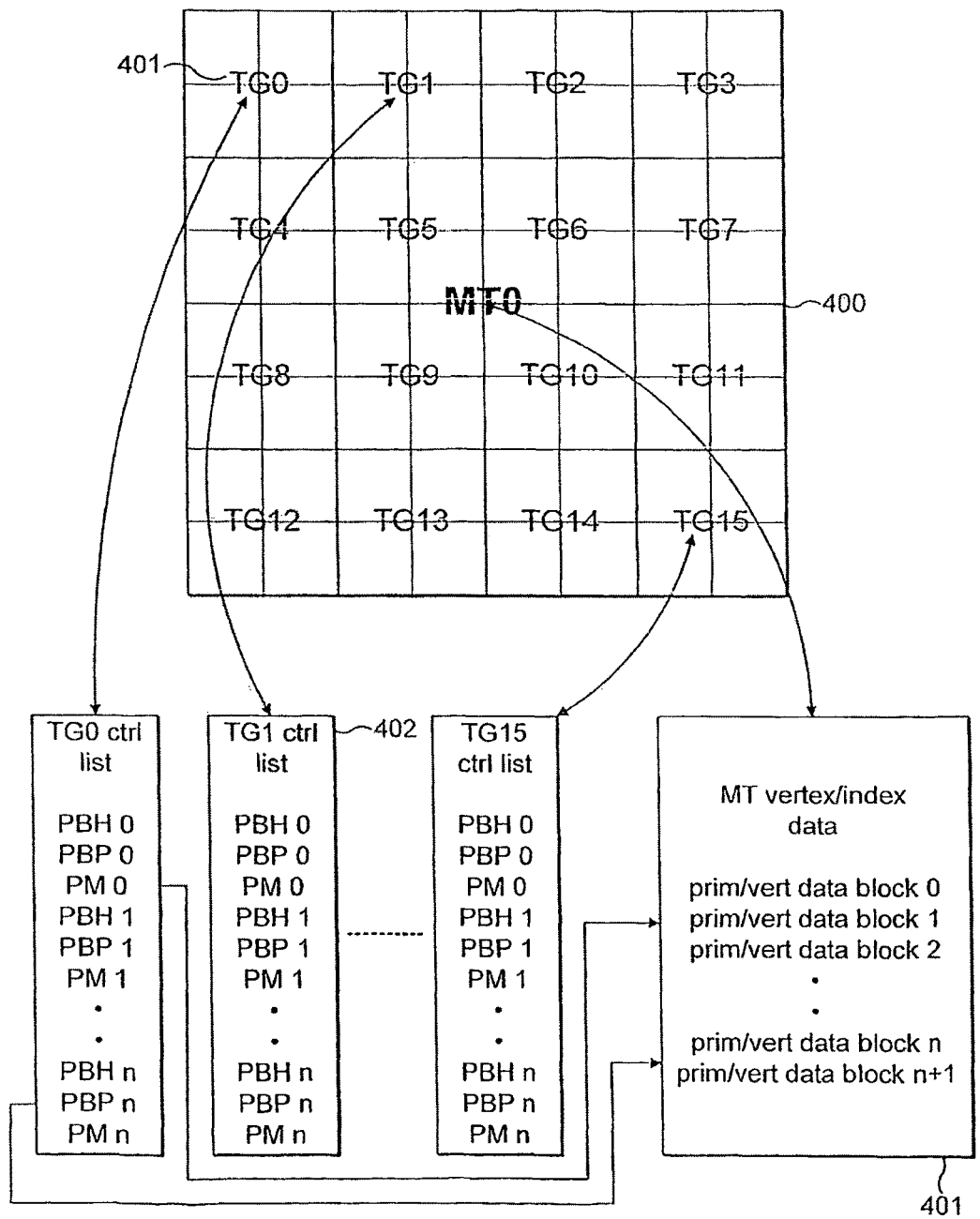
FIG. 4 shows an overview of the data structure for display list control stream grouping in a macro tile.

In the embodiment of control stream grouping, the tiles in a macro tile 400 are divided into tile groups with a fixed number of tiles, for example 2×2 tiles of 401 in FIG. 4. Region Array of 300 in FIG. 3 and Control Stream of 301 in FIGS. 3 and 402 in FIG. 4 are all based on tile groups rather than tiles. The render is still done on a tile by tile basis, but the tiles in a tile group will share the same region header words and control stream list.

The benefits of a control stream grouping based parameter stream structure are:

Because the control stream lists are based on tile groups, the number of control stream lists is reduced e.g. to about a quarter of the number of tile based control stream lists required. The same reduction is achieved for the number of tail pointers.

Figure 7:
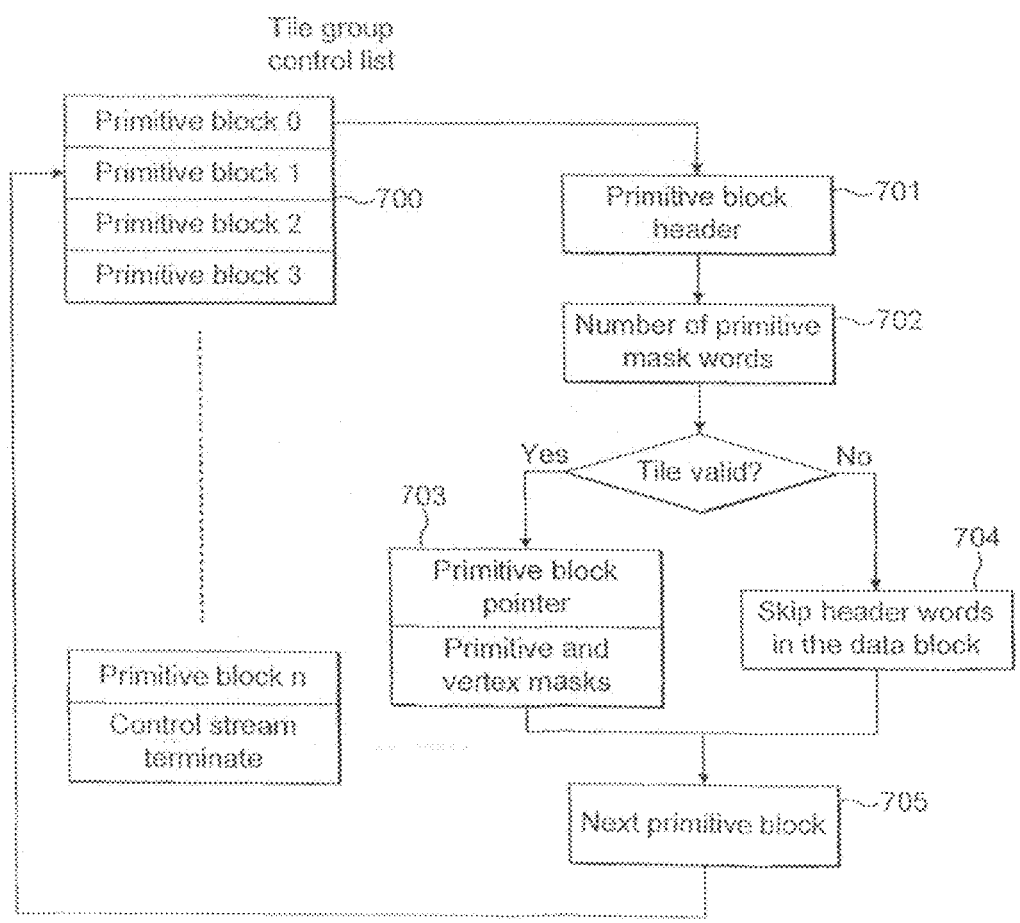
FIG. 7 shows an overview of the data structure for control stream data in a display list control stream grouping.
Figure 8:
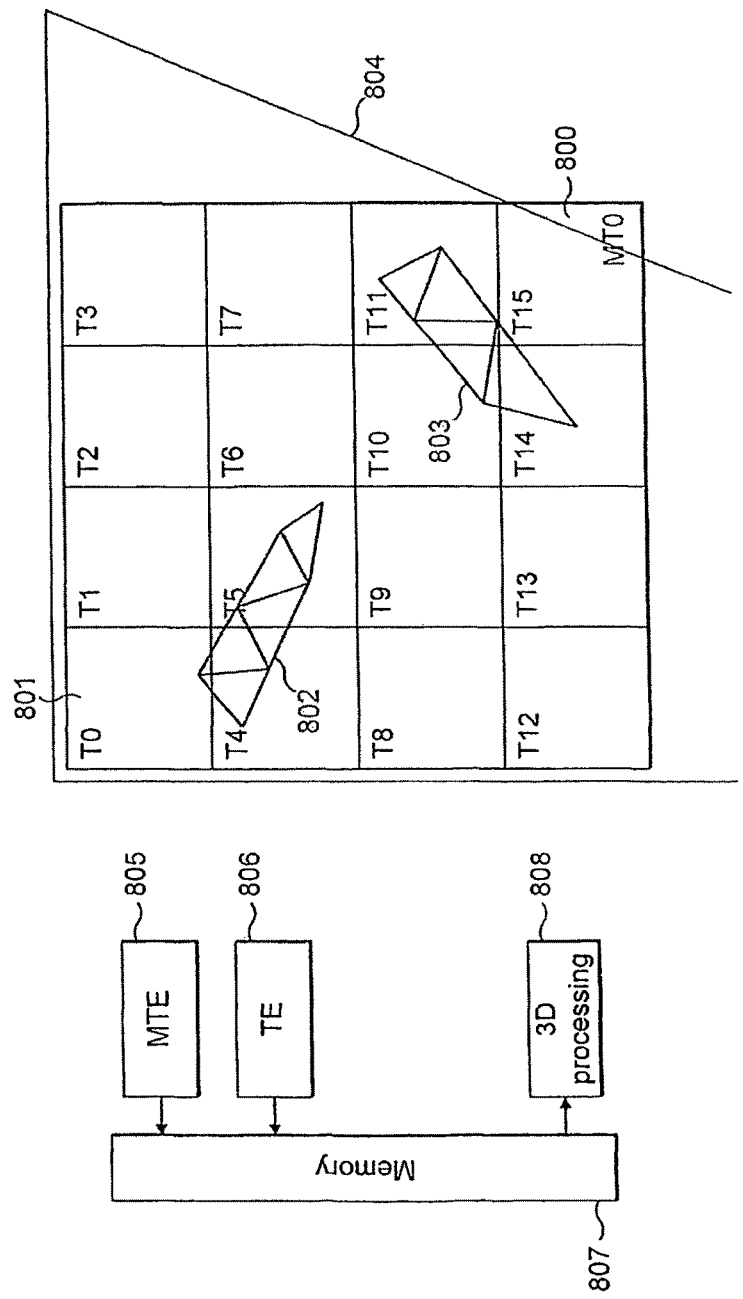
FIG. 8 shows an example of tile based render process.

The start address of each control data block allocated in memory for the control streams of tile groups is stored in a control pointer array at 701 in FIG. 7, there is no link pointer required. Control data are allowed to be written to cross control data blocks.

Figure 1:
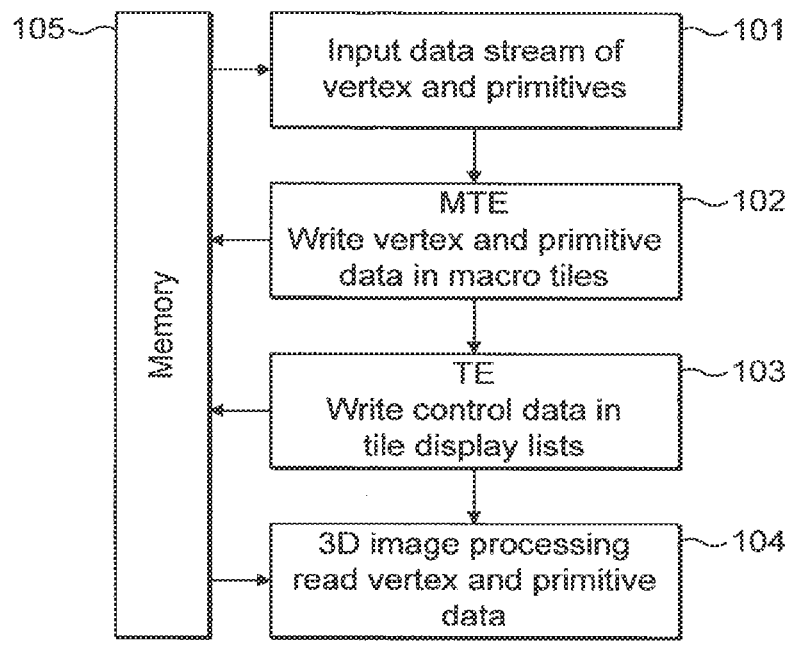
FIG. 1 shows an overview of the main steps performed for tiling in a tile based 3D computer graphics system.
Figure 2:
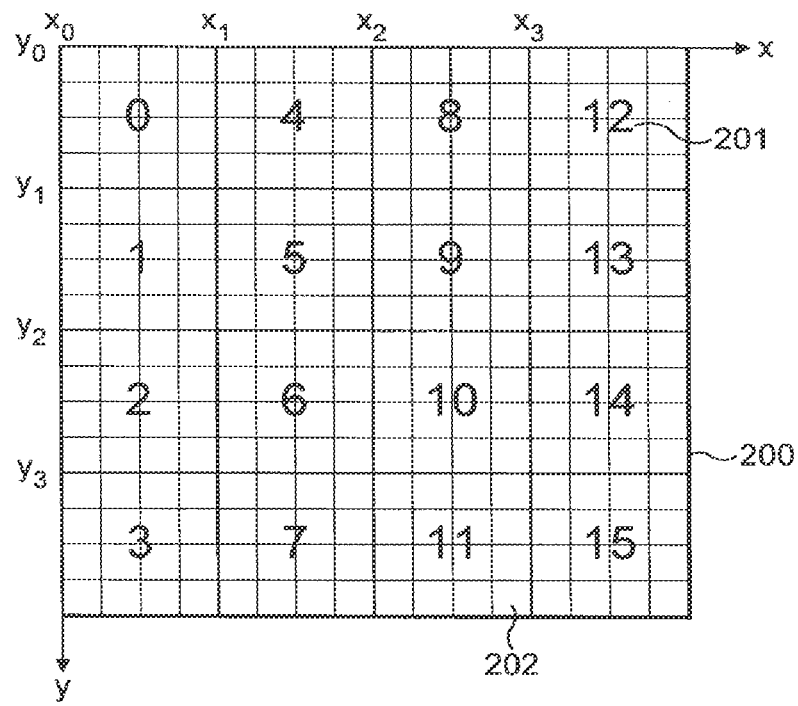
FIG. 2 shows macro tiles on screen used in a tile based 3D computer graphics system.

When control data in a control data block are not referenced in a tile, the whole control data block can be skipped in 3D processing 104 in FIG. 1.

The region header words are reduced to two 32 bits per tile group, rather than two 32 bits per tile. That is a 75% reduction on region array memory space for grouping of 2×2 tiles.

Of the three entities in a macro tile parameter stream data Region Array, Control Stream and Vertex/Index Blocks, the data structure of Region Array and Control Stream are different in the proposed method of control stream grouping. However Vertex/Index Block data are not changed in control stream grouping.

The manner in which the control stream data is modified is an embodiment of the invention is now described by way of example.

Region Array

The Region Array records the start of the control steam for each tile. The array is a contiguous set of region definitions, each of which consists of a Region Header word followed by a Control Base Address word.

The Region Array in the proposed method of control stream grouping is based on tile groups, for example 2×2 tiles rather than individual tiles. It stores the following data.

| Offset | Field |
|--------|-------|
| 0x0    | Region Header |
| 0x4    | Control Base Address |

Region Header

The Region Header word has information for all the tiles in a tile group with 8 bits each. On terminate a render, Tiling Engine 103 in FIG. 1 goes through all the tiles on screen to set up the 8 bit Region Header word for each tile, then combines the Region Header words in a tile group into a Region Header word for the tile group. The descriptions of the functions of the bits are shown below for the tile groups with 2×2 tiles. Bits 31, 23, 15, and 7 are unused.

Region Header Word

Render Start Region Position

There is no tile position X, Y provided in the Region Header word for tile groups. The start tile position and start macro tile for a render are defined in a separate register. Usually this position will be in a corner of the image to be rendered. The 3D processing 104 of FIG. 1 starts a 3D render from a tile position defined in the register. It reads the two Region Header words described above from the 3D region base address, then each of the tiles in the group are rendered.

Next Region Position

The 3D processing steps 104 in FIG. 1 calculates a next tale position X and Y automatically after finishing a render of a tile, using a predetermined tile order.

In an embodiment of the invention using a tile group the 2×2 tiles in the group each share the same control stream base address. Each of the tiles has its own 8 bit region information from the Region Header word. Because macro tile size is aligned to tile group size, the tiles in a tile group are always rendered in scan order. If the next tile is within the same tile group, then the next tile position is the tile group start tile position plus 1 in either X or Y direction, or both, for a 2×2 tile group.

After finishing a render for all tiles in a tile group, the next two 32 bits are read from Region Array as the Region Header word and the Control Base Address word for the next tile group.

| Bit | Symbol | Description |
|-----|--------|-------------|
| 30 | RGNHDR_FIRSTMACROTILE_TILE3 | When set indicates that tile (1, 1) from the tile group is the first tile within the macro tile |
| 29 | RGNHDR_LASTMACROTILE_TILE3 | When set indicates that tile (1, 1) from the tile group is the last tile within the macro tile |
| 26 | RGNHDR_LASTRGN_TILE3 | When set denotes tile (1, 1) from the tile group is the last region in the frame |
| 25 | RGNHDR_INVALID_TILE3 | When set indicates that tile (1, 1) from the tile group is invalid tile (not on screen or out of terminate bounding box) |
| 24 | RGNHDR_EMPTY_TILE3 | When set indicates that the tile (1, 1) from the tile group is empty. |
| 22 | RGNHDR_FIRSTMACROTILE_TILE2 | When set indicates that tile (0, 1) from the tile group is the first tile within the macro tile |
| 21 | RGNHDR_ LASTMACROTILE_TILE2 | When set indicates that tile (0, 1) from the tile group is the last tile within the macro tile |
| 18 | RGNHDR_LASTRGN_TILE2 | When set denotes tile (0, 1) from the tile group is the last region in the frame |
| 17 | RGNHDR_INVALID_TILE2 | When set indicates that tile (0, 1) from the tile group is invalid tile (not on screen or out of terminate bounding box) |
| 16 | RGNHDR_EMPTY_TILE2 | When set indicates that the tile (0, 1) from the tile group is empty. |
| 14 | RGNHDR_FIRSTMACROTILE_TILE1 | When set indicates that tile (1, 0) from the tile group is the first tile within the macro tile |
| 13 | RGNHDR_LASTMACROTILE_TILE1 | When set indicates that tile (1, 0) from the tile group is the last tile within the macro tile |
| 10 | RGNHDR_LASTRGN_TILE1 | When set denotes tile (1, 0) from the tile group is the last region in the frame |
| 9 | RGNHDR_INVALID_TILE1 | When set indicates that tile (1, 0) from the tile group is invalid tile (not on screen or out of terminate bounding box) |
| 8 | RGNHDR_EMPTY_TILE1 | When set indicates that the tile (1, 0) from the tile group is empty. |
| 6 | RGNHDR_FIRSTMACROTILE_TILE0 | When set indicates that tile (0, 0) from the tile group is the first tile within the macro tile |
| 5 | RGNHDR_LASTMACROTILE_TILE0 | When set indicates that tile (0, 0) from the tile group is the last tile within the macro tile |
| 2 | RGNHDR_LASTRGN_TILE0 | When set denotes tile (0, 0) from the tile group is the last region in the frame |
| 1 | RGNHDR_INVALID_TILE0 | When set indicates that tile (0, 0) from the tile group is invalid tile (not on screen or out of terminate bounding box) |
| 0 | RGNHDR_EMPTY_TILE0 | When set indicates that the tile (0, 0) from the tile group is empty. |

The position of the next tile group is calculated using the macro tile size and macro tile mode which can be pre defined in a register. The number of tiles in a tile group is fixed, for example 2×2 tiles. Tile groups are rendered in scan order inside a macro tile. Macro tiles are preferably rendered in the order of vertical lines. Therefore the position of the next tile group can be calculated automatically in the 3D processing.

Control Base Address

This is the other data stored in the region array and is a pointer to the start of the control stream referenced by a tile group. The base address of the control stream is always 128 bit aligned when generated by the Tiling Engine TE at 103 in FIG. 1, and in 3D processing 104 in FIG. 1. A Control Base Word is read for the first tile in a tile group, and is shared by all the tiles in the tile group.

Control stream data for a tile group are written into fixed sized memory blocks allocated for the tile group, for example 16 32 bits control data blocks 302 as shown.

There is a 4 bit field CONTROL_BLOCK_TILE_VALID contained in the Control Base Address Word, which indicates whether or not the control stream data from a control data block are referenced by the tiles in the tile group. Bit 28 is for tile (0, 0), bit 29 for tile (1, 0), bit 30 for tile (0, 1) and bit 31 for tile (1, 1) in the tile group. If the bit in field CONTROL_BLOCK_TILE_VALID is not set for a tile, then the control data block can be skipped in 3D processing of the tile. But a control data block cannot be skipped if it is the last control data block with CONTROL_BLOCK_LAST set, or if the control data block contains a control pointer array.

After a control data block skip, 3D processing 104 in FIG. 1 continues to process a tile from the next valid control data block. The 32 bits offset PRIM_BLOCK_OFFSET is used to retrieve a first primitive block header word from the control data block after skip. The structure of the Control Base Address Word is shown below for tile groups with 2×2 tiles.

Control Base Address Word

| Bit | Symbol | Description |
|---|---|---|
| 31:28 | CONTROL_BLOCK_TILE_VALID | Valid mask for the control data block in each tile of the tile group. If the valid mask is not set for a tile, then the control data block can be skipped in the tile. |
| 27:25 | PRIM_BLOCK_OFFSET | The 32 bits offset of the first primitive block header word in the control data block. Used after skip control data blocks which are not referenced by a tile |
| 24:24 | CONTROL_BLOCK_LAST | If set the control data block is the last control data block for the tile group. |
| 21:0 | CONTROL_BASE_ADDRESS | Points to the start of the control stream for the current tile group. The address is 128 bits aligned and has a 256 Mb range. |

Control Stream

The 3D display list control stream consists of a sequence of block headers, each of which can be followed by an object dependent amount of data, as shown at 302 in FIGS. 3 and 402 in FIG. 4. The various elements of the control stream are described below.

Block Header

The top two bits bit 31 and 30 in each primitive block header are reserved for the primitive block header type, with 01 for Primitive Block and 11 for Control Stream Terminate. When control stream data 402 in FIG. 4 are processed in a tile group, the two bits 31 and 30 in each block header word are analyzed first to decide if the block header word is a Primitive Block Header word or a Control Stream Terminate word. In the case of a Primitive Block Header word, extra header words such as Primitive Block Pointer word and Primitive Mask word may exist after Primitive Block Header words.

Primitive Block

The primitive block defines a block of primitive data for a tile group at 303 in FIG. 3. The data include index/vertex data, and potentially the state associated with primitives in the block. There are header words in the control stream for each primitive block and in the tile group references. The header words include Primitive Block Header word, Primitive Block Pointer word and Primitive Mask words.

Primitive mask words provided with a primitive block are used to define which primitives and vertices in the current block are referenced within each tile of the tile group. For example if there are up to 32 primitives in a primitive block, then a 32 bits primitive mask is required are bit per primitive. A primitive block may contain up to 16 vertices, however, not all of them may be used in a particular tile. A 16 bits vertex mask is therefore required to define the vertices referenced by the primitives in the block, are bit per vertex.

The primitive mask words are optional and are not present if all primitives in the primitive block are to be referenced in all the tiles of the tile group. In this case, the primitive mask and the vertex mask are assumed to be fully set, that is every tile in the tile group references all primitives in this block and the primitives reference all vertices in the primitive block.

The total number of primitive mask words varies between primitive blocks depending on the primitive mask format of the tiles in the tile group. An example is shown below.

| Offset | Field |
|---|---|
| 0x00 | Primitive Block Header |
| 0x04 | Primitive Block Pointer |
| 0x08 | Primitive Mask |
| 0x0C | Primitive Mask |

-continued

| Offset | Field |
|---|---|
| 0x10 | Primitive Mask |
| 0x14 | Primitive Mask |
| 0x18 | Primitive Mask |

Primitive Block Header

Primitive Block Header word contains 32 bits representing the information for the number of vertices in the primitive block. It also contains the primitive mask format for each of the 2×2 tiles. This structure is as follows from the various control functions denoted by each bit.

| Bit | Symbol | Description |
| --- | --- | --- |
| 31:30 | PF_OBJTYPE | 01 PRIMITIVE BLOCK |
| 29 | PF_FULL_MASK | If set, it indicates all the tiles in the tile group are valid and have the full primitive mask, so no primitive mask/vertex mask are present in the primitive block data. |
| 28:25 | PF_VERTEX_COUNT | The number of vertices in the primitive block minus 1. |
| 20 | PF_SAME_MASK | If set, it indicates the tiles in the tile group have the same primitive mask, so only one primitive mask and one vertex mask are present in the primitive block data. |
| 19:18 | PF_PRIM_MASK_START3 | When the format of PF_PRIM_MASK_FMT3 is packed (10), the 2 bits indicate the byte offset of the packed mask data within the primitive mask. |
| 17:17 | PF_VERT_MASK_START3 | When the format of PF_PRIM_MASK_FMT3 is packed (10), this bit indicates the byte offset of the vertex mask data. If set the byte in the packed mask data is byte 1 of the vertex mask for the tile, otherwise it's byte 0 of the vertex mask. |
| 16:15 | PF_PRIM_MASK_FMT3 | The 2 bits primitive mask format word for tile (1, 1) in the tile group.<br>00 - The tile is invalid for the primitive block.<br>01 - Full primitive mask in the tile.<br>10 - Primitive and vertex masks data are packed into 2 bytes.<br>11 - Primitive and vertex masks data are not packed. |
| 14:13 | PF_PRIM_MASK_START2 | When the format of PF_PRIM_MASK_FMT2 is packed (10), the 2 bits indicate the byte offset of the packed mask data within the primitive mask. |
| 12:12 | PF_VERT_MASK_START2 | When the format of PF_PRIM_MASK_FMT2 is packed (10), this bit indicates the byte offset of the vertex mask data. If set the byte in the packed mask data is byte 1 of the vertex mask for the tile, otherwise it's byte 0 of the vertex mask. |
| 11:10 | PF_PRIM_MASK_FMT2 | The 2 bits primitive mask format word for tile (0, 1) in the tile group.<br>00 - The tile is invalid for the primitive block.<br>01 - Full primitive mask in the tile.<br>10 - Primitive and vertex masks data are packed into 2 bytes.<br>11 - Primitive and vertex masks data are not packed. |
| 9:8 | PF_PRIM_MASK_START1 | When the format of PF_PRIM_MASK_FMT1 is packed (10), the 2 bits indicate the byte offset of the packed mask data within the primitive mask. |
| 7:7 | PF_VERT_MASK_START1 | When the format of PF_PRIM_MASK_FMT1 is packed (10), this bit indicates the byte offset of the vertex mask data. If set the byte in the packed mask data is byte 1of the vertex mask for the tile, otherwise it's byte 0 of the vertex mask. |
| 6:5 | PF_PRIM_MASK_FMT1 | The 2 bits primitive mask format word for tile (1, 0) in the tile group.<br>00 - The tile is invalid for the primitive block.<br>01 - Full primitive mask in the tile.<br>10 - Primitive and vertex masks data are packed into 2 bytes.<br>11 - Primitive and vertex masks data are not packed. |
| 4:3 | PF_PRIM_MASK_START0 | When the format of PF_PRIM_MASK_FMT0 is packed (10), the 2 bits indicate the byte offset of the packed mask data within the primitive mask. |
| 2:2 | PF_VERT_MASK_START0 | When the format of PF_PRIM_MASK_FMT0 is packed (10), this bit indicates the byte offset of the vertex mask data. If set the byte in the packed mask data is byte 1 of the vertex mask for the tile, otherwise it's byte 0 of the vertex mask. |
| 1:0 | PF_PRIM_MASK_FMT0 | The 2 bits primitive mask format word for tile (0, 0) in the tile group.<br>00 - The tile is invalid for the primitive block.<br>01 - Full primitive mask in the tile.<br>10 - Primitive and vertex masks data are packed into 2 bytes.<br>11 - Primitive and vertex masks data are not packed. |

Primitive Block Pointer

This is another 32 bit word after the Primitive Block Header

Control Pointer Array

The data in a display list control stream for tile groups are written in the fixed size memory blocks allocated internally,

| Bit | Symbol | Description |
| --- | --- | --- |
| 31:27 | PF_PRIM_COUNT | The number of primitives in the primitive block minus 1. |
| 25:0 | PF_VERTEXBLOCKPTR | A 32-bit aligned address that is capable of accessing a 256 MB range. | for example 16 32 bits memory blocks. Because these control data blocks may not be in contiguous memory addresses, the start address of the next control data block has to be available in some way to process the control stream data in the next control data block 302. Normally an address pointer for the linked control data block can be inserted at the end of the current control data block. In this way the 3D processing has to wait until the whole control data block is processed to get the start address of the next control data block. When the control stream data in a control data block can be skipped for a tile of the tile group, it is not very efficient to process the control data block just to get the link address for the next control data block.

In the proposed method of display list control stream grouping, control pointer arrays are used in the control data block to allow the control stream to be generated for a tile group being processed continuously in 3D processing.

Figure 5:
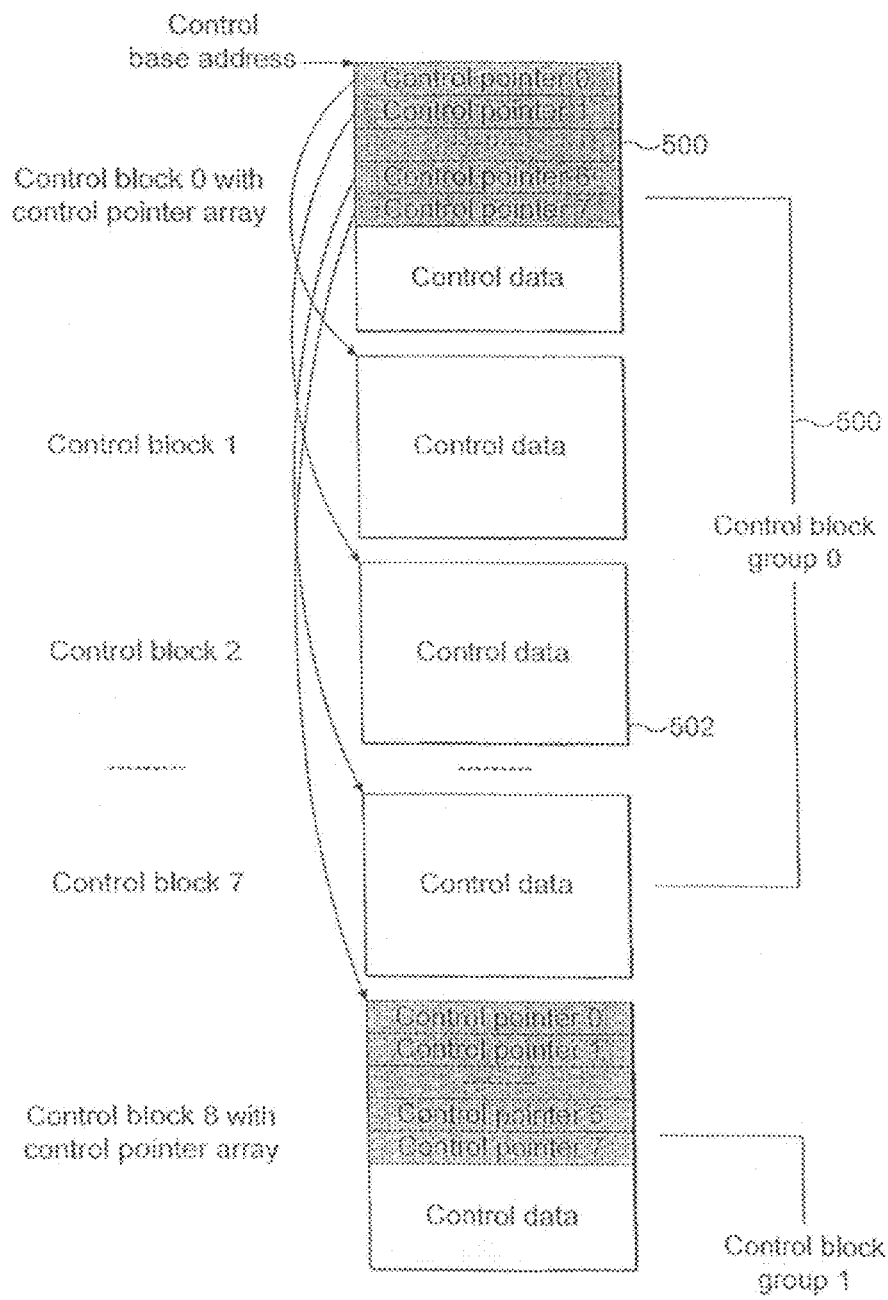
FIG. 5 shows the data structure of control data block groups in a display list control stream grouping.

In a control stream grouping, control data blocks are organized in groups of 8 control blocks, at 500 shown in FIG. 5. The first control block in a group has the first 8 32 bits reserved for a control pointer array, at 501 in FIG. 5. Each of the control pointers has the same format as a Control Base Address Word in the region header, it points to the start address of a control data block in the group of 8, at 502 in FIG. 5.

The start address of the first control data block in the first control block group is from the region header word Control Base Address Word. The 8$^{th}$ control pointer in the control pointer array points to the start address of the next control block group.

Because the start addresses of all the control data blocks are kept in the control pointer array in control blocks, there is no need for link pointers. In 3D processing the control pointers from the first control block are read first, and the control pointers are used to get the start addresses of the control data blocks in the control data block group. The 3D processing does not need to wait until the end of a control data block to get the address for next control data block. It continuously processes the control blocks in a control block group. This scheme increases the performance of 3D processing in the method of control stream grouping.

For some primitive blocks, not every tile in the tile group is covered by the primitives in the primitive block. For the tiles which are not covered by a primitive block, the control data in a tile group control stream should be skipped by the 3D processing.

Another benefit of using a control pointer array is that control data blocks can be skipped if the bit in CONTROL_BLOCK_TILE_VALID is not set for a tile. This means the control data in the control data block are not referenced by the tile. The 3D processing continuously processes the control data blocks in a control block group even when a whole control data block is skipped for a tile in the tile group. Because of the ability to skip control data blocks which are not referenced in a tile, the number of consecutive skipped primitive blocks is limited.

A control data block cannot be skipped if it is the last control data block with CONTROL_BLOCK_LAST set, or the control data block contains control pointer array.

When a control data block is allocated, the start address of the control data block is stored for the tile group. The 32 bits offset of the first primitive block header PRIM_BLOCK_OFFSET is stored as well. In order to fill in the fields of CONTROL_BLOCK_TILE_VALID and CONTROL_BLOCK_LAST, the control pointer word has to be written when a control data block is finished. That is to write out the previous control pointer word when a new control data block is allocated. The last control pointer word is written on terminate a render with CONTROL_BLOCK_LAST bit set.

Control Stream Data Block

The data size of a primitive block varies due to the optional Primitive Mask Words. To improve the efficiency of control stream memory usage, control stream data for a primitive block is allowed to be written across two 16 32 bits control data blocks.

Figure 6:
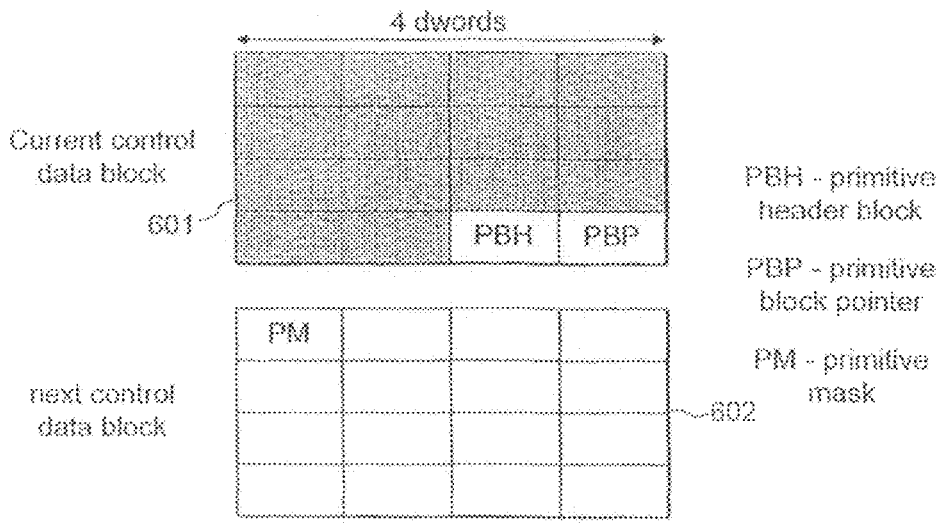
FIG. 6 shows control stream data written across control data blocks in a display list control stream grouping.

FIG. 6 shows an example of a primitive block which has three control stream words Primitive Block Header, Primitive Block Pointer and one Primitive Mask Word. There are two 32 bits free space in the current data block 601 in FIG. 6, so the Primitive Mask word is written at the start of the next control data block as 602 in FIG. 6.

Primitive Mask and Vertex Mask

A primitive block contains a fixed number of primitives, and vertices, for example up to 32 primitives and 16 vertices. Because not all of the primitives may be visible in the tiles of a tile group, a primitive mask and a vertex mask are used in a primitive block to indicate the primitives and vertices referenced in each tile of the tile group.

In the proposed method of control stream grouping each of the 2×2 tiles in a tile group has its own primitive mask format in the Primitive Block Header word. The formats in 2 bit primitive mask format word are:

Tile Invalid

This means that no primitive from the primitive block is referenced in the tile, no primitive and vertex masks for the tile. In this case 3D processing skips the primitive block in the tile of the tile group.

Full Mask

This means that all primitives are referenced in the tile of the tile group. In this case no primitive and vertex mask data is needed in the control stream. 3D processing sets the full primitive and vertex masks automatically.

Packed Mask Data

When there is only 1 non 0 bytes in both the primitive mask and the vertex mask for a tile of the tile group, the 2 non 0 byte can be packed into a 2 byte mask word for the tile in the control stream, rather than 6 byte mask when the primitive block contains a maximum 32 primitives and 16 vertices. For the case when the non 0 byte is not at the start of the mask data, a 1 bit byte offset for vertex mask and a 2 bits byte offset for primitive mask are used in Primitive Block Header word for each tile in the tile group.

For example a primitive block with primitive mask 00000000 00000000 10100100 00000000 (0x0000A400) and vertex mask 01101100 00000000 (0x6C00), the mask data can be packed into 0xA46C and written into the control stream instead of 0x0000A400 and 0x6C00. In Primitive Block Header the primitive mask format PF_PRIM_MASK_FMT will be set 10 as packed mask data for the tile. The byte offset PF_VERT_MASK_START is set to 1 and PF_PRIM_MASK_START is set to 01 for the tile. In 3D processing the vertex mask data is reconstructed from 0x6C into 0x6C00, and primitive mask from 0xA4 to 0x0000A400 using the primitive mask format and byte start bits.

Unpacked Mask Data

The primitive mask and vertex mask are not packed for the tile.

Same Primitive Mask

When flag PF_SAME_MASK in Primitive Block Header word is set, it indicates all tiles in the tile group have the same primitive mask. In this case only one primitive mask and one vertex mask are written in the control stream for the tile group.

Number of Primitive Mask Words

Primitive and vertex masks in each tile of the tile group are written in the control stream as byte aligned data. Primitive mask data is rounded up into 32 bits at the end. The total number of Primitive Mask words in a primitive block can be calculated from the primitive mask format of the tiles in the tile group.

Statistics show on average there are less than 2 Primitive Mask words used in each primitive block for a tile group with 2×2 tiles.

Tail Pointer

Tail pointer words are stored per tile in Tiling Engine (TE) 103 in FIG. 1 to contain the information of the free address pointer in the control data block for a tile, and some other tile related information. In the proposed method of control stream grouping there is one Tail Pointer per tile group, rather than per tile.

There are two Tail Pointer words per tile group. A four bit field TP_TILE_VALID in Tail Pointer Word 1 is used for tail pointer valid in tiles of the tile group, the bit is set if the tile is covered by any primitive blocks. On the termination of a render, a terminate word is written at the end of the control stream list if any bit in field TP_TILE_VALID of tail pointer is non 0. If any bit in TP_TILE_VALID is 0, then the related tile is set to be an empty tile when the render is terminated.

In order to fill in the fields of CONTROL_BLOCK_TILE_VALID and CONTROL_BLOCK_LAST in control pointer word, Tiling Engine TE has to write the control pointer when a control data block is finished. That is to write out the previous control pointer word when a new control data block is allocated. The bit TP_REGION_OUTPUT in Tail Pointer Word 1 is a flag to indicate if the Control Base Address Word has been written into the region header or not. The first control pointer word is written in region header as Control Base Address Word if TP_REGION_OUTPUT is not set, otherwise is written to control pointer array in the first control data block of the control block group.

Tail Pointer Word 1

The structure of the Tail Pointer Word is as follows

After the first control data block in the control stream list of a tile group, any subsequent control pointer words are written in the control pointer array on the top half of the first control data block in a group of B control data blocks. The address for the next control pointer word is stored in Tail Pointer Word 2 as TP_CTRL_POINTER_ADDR. Combined with the 32 bits offset TP_CTRL_POINTER_OFFSET, up to 8 control pointer words can be written into a control pointer array in the first control data block of a group of control data blocks.

A four bits field TP_CTRL_BLOCK_TILE_VALID is used to indicate if the control block is valid or not in tiles of the tile group. If the control stream data in the control block are not referenced by a tile, then the relevant bit in TP_CTRL_BLOCK_TILE_VALID will be 0. In this case the control block is skipped and the next control block is processed. Each time the control stream data for a primitive block is written in the control data block, the field TP_CTRL_BLOCK_TILE_VALID is updated with the tile valid flags from the primitive block. After the control block is totally filled with control stream data, the field TP_CTRL_BLOCK_TILE_VALID is written in the control pointer word as CONTROL_BLOCK_TILE_VALID.

The field TP_PRIM_BLOCK_OFFSET is the 32 bits offset of the first primitive block header word in a control block. It is used by 3D processing to get the first primitive block header after skip control blocks. The offset of the first primitive block header word in a control block has to be stored in Tail Pointer Word 2, and written into field PRIM_BLOCK_OFFSET of the control pointer word.

| Bit | Symbol | Description |
| --- | --- | --- |
| 31:28 | TP_TILE_VALID | Tail pointer valid flag for each of the 2x2 tiles in a tile group. If bit 31 is set, tail pointer is valid in tile (1, 1). If bit 30 is set, tail pointer is valid in tile (0, 1). If bit 29 is set, tail pointer is valid in tile (1, 0). If bit 28 is set, tail pointer is valid in tile (0, 0). |
| 27 | TP_REGION_OUTPUT | If set it indicates the control base address has written into the region header word. If not set that means it is the first control pointer word |
| 25:22 | TP_DWORD_COUNT | Count for the number of 32 bits words written in the control data block. |
| 21:0 | TP_CTRL_BLOCK_ADDR | The address to the start of the control data block, it is 16 32 bits aligned and is capable of accessing a 256 MB range. |

Tail Pointer Word 2

| Bit | Symbol | Description |
| --- | --- | --- |
| 31:28 | TP_CTRL_BLOCK_TILE_VALID | Valid mask for the control data block in each tile of the tile group. If the valid mask is not set for a tile, then the control data block can be skipped in the tile. If bit 31 is set, control data block is valid in tile (1, 1). If bit 30 is set, control data block is valid in tile (0, 1). If bit 29 is set, control data block is valid in tile (1, 0). If bit 28 is set, control data block is valid in tile (0, 0). |

-continued

| Bit | Symbol | Description |
|---|---|---|
| 27:25 | TP_PRIM_BLOCK_OFFSET | The 32 bits offset of the first primitive block header word in the control data block. Used after skip control data blocks which are not referenced by a tile. |
| 24:22 | TP_CTRL_POINTER_OFFSET | 32 bits offset of the next control pointer in the control data block with control pointer array of 8 control pointers. |
| 21:0 | TP_CTRL_POINTER_ADDR | The address to the start of the first control data block in the control block group with control pointer array, it is 16 32 bits aligned and is capable of accessing a 256 MB range. |

Control Stream Data Parsing in 3D Processing

FIG. 7 shows the control stream data parsing in 3D processing. Primitive block header words including Primitive Block Header Word, Primitive Block Pointer Word and Primitive Mask Words are fetched from the control stream data for the tile group as 700 in FIG. 7. For each primitive block the Primitive Block Header Word 701 is examined to get the number of Primitive Mask Words 702 if present. It can be know from the Primitive Block Header Word if the tile is valid or not for the primitive block. If the tile is valid, that is there are primitives from the primitive block which cover the tile, then the Primitive Block Pointer Words are fetched as well as Primitive Mask Words for the 3D processing at 703. Primitive header words are skipped if the tile is not valid for the primitive block at 704, as defined in Primitive Block Header Word.

Primitive block header words are processed continuously from the control stream data in a tile group, until the terminate word of the control stream, which is the end of the control stream in the tile group for a render.

System Level Cache for Control Stream Data

There are eight control pointers in the control pointer array in a control block group written at the start of the first control data block in the group. The write addresses for control pointers and control stream data are likely from different control data blocks. The control data blocks are allocated dynamically, therefore they may be in different memory pages. This increases the chance of a memory page break between control pointer write and control stream data write.

To reduce the memory page break and improve control stream data write performance, a system level cache dedicated to control stream data write can be used in the proposed method of control stream grouping.

The control stream data cache uses a 16 way associative pseudo LRU cache algorithm as a system level cache. The control stream data cache also use masked write, therefore there is no need for a memory read to load the data from memory after a cache line is flushed.

Cache lines in control stream data cache need to be flushed and invalidated on terminate a render. On the case of multi contexts, context ID can be stored in each cache line of the control stream data cache. On terminate a render only the cache lines with the same context ID as the context ID of the current render are flushed and invalidated, to enhance the cache performance.

Experiments show on average control stream data writes are reduced by 15% with a 64 KB control stream data cache.

The invention claimed is:

1. A method for rendering a computer graphics image of a 3-D scene in a computer graphics system configured to use a rendering space which is divided into a plurality of tiles, wherein the plurality of tiles are grouped into a plurality of tile groups, the method comprising:

grouping primitives of said 3-D scene into primitive blocks;

for each tile group, generating a control stream data list indicating which primitive blocks contain at least one primitive that overlaps a tile said tile group, said control stream data lists comprising a plurality of control data block groups each containing a plurality of control data blocks, wherein a first control data block of a control data block group includes an array of control pointers pointing to start addresses of subsequent control data blocks in said control data block group and a start address of a subsequent control data block group in said control stream data list;

for each tile of a tile group for which a primitive block is indicated in the control stream data list for that tile group, accessing control stream data from the control stream data list for that tile group, determining which control data blocks in said control stream data list should be used to render that tile, which control data blocks in said control stream data list should not be used to render that tile, and using said control pointers to selectively access control stream data from control data blocks to render said tile of the image.

2. The method according to claim 1, wherein the control data blocks are fixed size blocks in memory.

3. The method according to claim 1, further comprising providing a region array indicating a region header for each of the tile groups, and a control base address pointing to a start position for control stream data referred by a respective tile group.

4. The method according to claim 1, further comprising including a respective pointer to vertex data for each primitive block required to render the tile group to which a control stream data list pertains.

5. The method according to claim 4, further comprising forming a respective control stream data list for each tile group to include a primitive mask for each primitive block identified in the control stream data list for that tile group, and using the primitive mask to determine which primitives are used to render that tile group.

6. The method according to claim 1, further comprising providing, for each primitive block identified by a control stream data list, a primitive block header with data identifying each primitive block in each control stream data list, the primitive block header representing the number of vertices in the primitive block.

7. The method according to claim 1, further comprising storing in memory two tail pointer words for each tile group.

8. Apparatus for rendering a computer graphics image of a 3-D scene using a rendering space that is divided into a plurality of tiles, wherein the plurality of tiles are grouped into a plurality of tile groups, the apparatus comprising:

a macro tiling engine configured:
  to group primitives of said 3-D scene into primitive blocks,
  for each tile group, to generate a control stream data list indicating which primitive blocks contain at least one primitive that overlaps a tile of said tile group, said control stream data lists comprising a plurality of control data block groups each containing a plurality of control data blocks, wherein a first control data block of a control data block group includes an array of control pointers pointing to start addresses of subsequent control data blocks in said control data block group and a start address of a subsequent control data block group in said control stream data list; and
  a 3-D rendering processor configured to, for each tile of a tile group for which a primitive block is indicated in the control stream data list for that tile group, access control stream data from the control stream data list for that tile group, determine which control data blocks in said control stream data list should be used to render that tile, which control data blocks in said control stream data list should not be used to render that tile, and use said control pointers to selectively access control stream data from control data blocks to render said tile of the image.

9. The apparatus according to claim 8, wherein the control data blocks are fixed size blocks in memory.

10. The apparatus according to claim 8, wherein the macro tiling engine is further configured to provide a region array for each of the tile groups, and a control base address pointing to a start position for the each control stream data list for a respective tile group.

11. The apparatus according to claim 8, wherein the macro tiling engine is further configured to provide a primitive block header for a primitive block, in the control stream data list for each tile group having a tile overlapped by a primitive of that primitive block.

12. The apparatus according to claim 11, wherein the primitive block header includes a primitive mask having one bit per primitive and the 3-D processing unit is further operable to use each bit of the primitive mask to determine whether the primitive associated with that bit is required during rendering of the tile group to which that control stream data list pertains.

13. The apparatus according to claim 11, wherein the primitive block header comprises data representing the number of vertices used for forming primitives in the primitive block.

14. The apparatus according to claim 8, wherein two tail pointer words are stored in memory for each tile group.

15. The apparatus according to claim 8, wherein each control stream data list is formed to include, in association with identifying information for a primitive block, a bit for each tile in the tile group to which that control stream data list pertains, the bit indicating whether or not that primitive block overlaps a specific tile of that tile group.

16. The apparatus according to claim 8, wherein a control stream data list further includes data indicating that specified mask data is applicable to multiple primitive blocks identified in that control stream data list.

17. The apparatus according to claim 8, wherein control stream data lists are formed to include, in association with identifying information for a primitive block, a variable number of mask words, wherein each mask word corresponds to one or more primitive blocks, and a single mask word is provided for multiple primitive blocks in response to the tiling unit determining that all of the multiple primitive blocks require the same mask word.

* * * * *